United States Patent [19]

Bianco

[11] 4,136,989

[45] Jan. 30, 1979

[54] EXPANDABLE ANNULAR CAM-TYPE LOCKING DEVICE FOR A SHAFT

[76] Inventor: Romolo P. Bianco, 2803 Grindley Pk., Dearborn, Mich. 48124

[21] Appl. No.: 798,077

[22] Filed: May 18, 1977

[51] Int. Cl.² ............................................ F16B 21/00
[52] U.S. Cl. .................................. 403/261; 308/236; 403/344
[58] Field of Search .................. 403/261, 344, 16, 15; 308/236

[56] References Cited

U.S. PATENT DOCUMENTS

| | | | |
|---|---|---|---|
| 1,294,792 | 2/1919 | Gray | 308/236 |
| 2,678,856 | 5/1954 | Chievitz | 308/236 |
| 3,033,597 | 5/1962 | Miller | 403/15 |
| 3,304,139 | 2/1967 | Toth et al. | 308/236 |
| 4,012,154 | 3/1977 | Durwin et al. | 403/261 |

*Primary Examiner*—Andrew V. Kundrat
*Attorney, Agent, or Firm*—Cullen, Sloman, Cantor, Grauer, Scott & Rutherford

[57] ABSTRACT

The expandable annular cam-type locking device is particularly applicable for use on mill roll necks, shafts and the like. The annular locking device is adapted to be disposed in an annular groove of a mill roll neck or shaft for retaining one or more sleeve-like members, anti-friction bearings, seals, spacers or the like together as a unit against a fixed abutment of the shaft for maintaining the member or plurality of members in proper working or spaced relationship on the shaft. The annular locking device comprises a pair of annular members or segments each having a pair of flat surfaces. One or more circular recesses is located in one surface of each annular member and each recess is provided with an expandible circular cam insert having flat faces. Threaded fastening elements are carried by the annular members and are threadedly connected to the inserts for expanding or moving same relative to the recesses. With such a construction, when the annular members are disposed about a shaft, the rotation of the threaded fastening elements in one direction urge the inserts against the sleeve-like elements, bearings or the like and in turn against the abutment provided on the shaft so as to locate and maintain the various elements on the shaft in the required working relationship.

22 Claims, 12 Drawing Figures

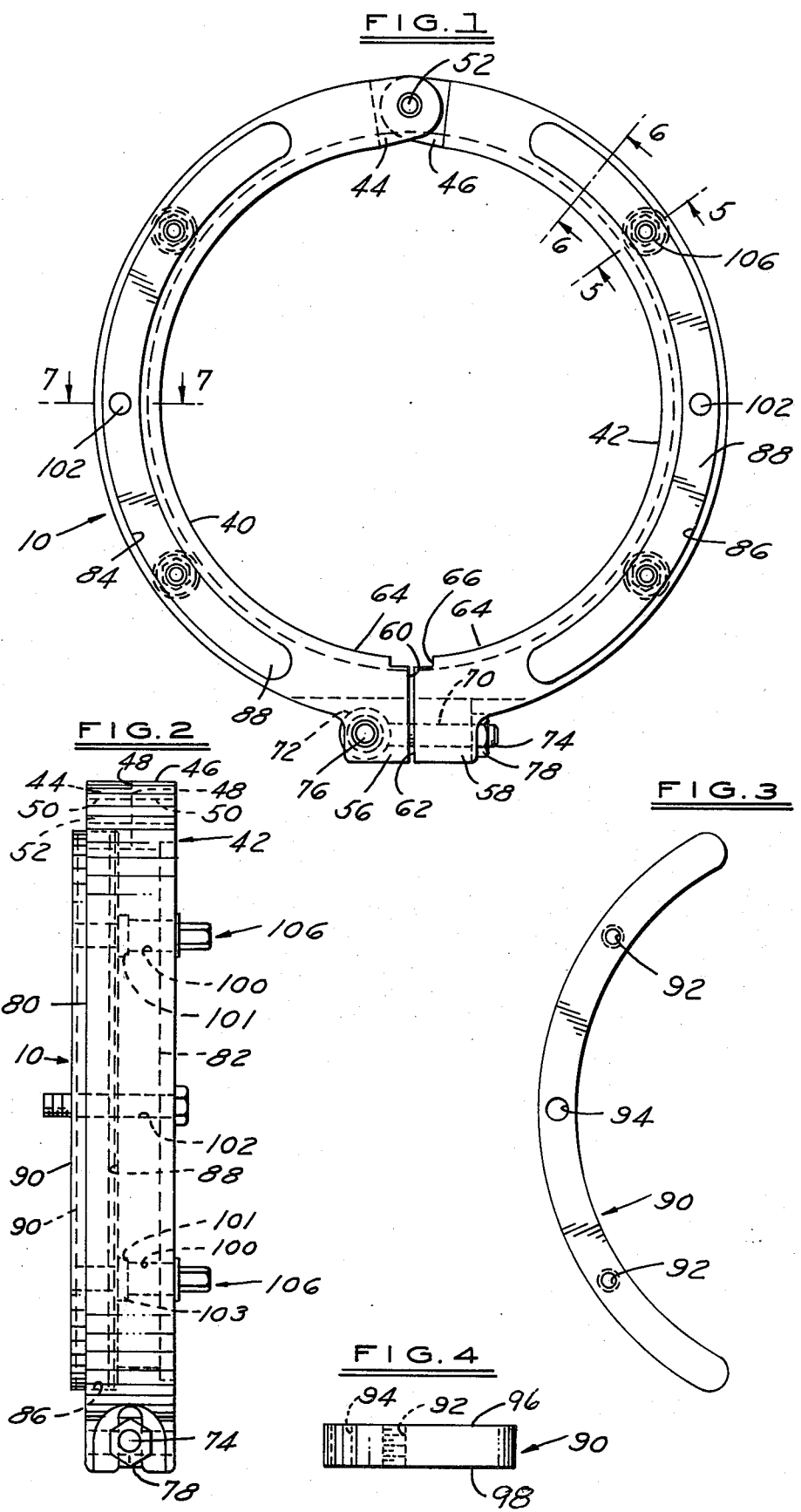

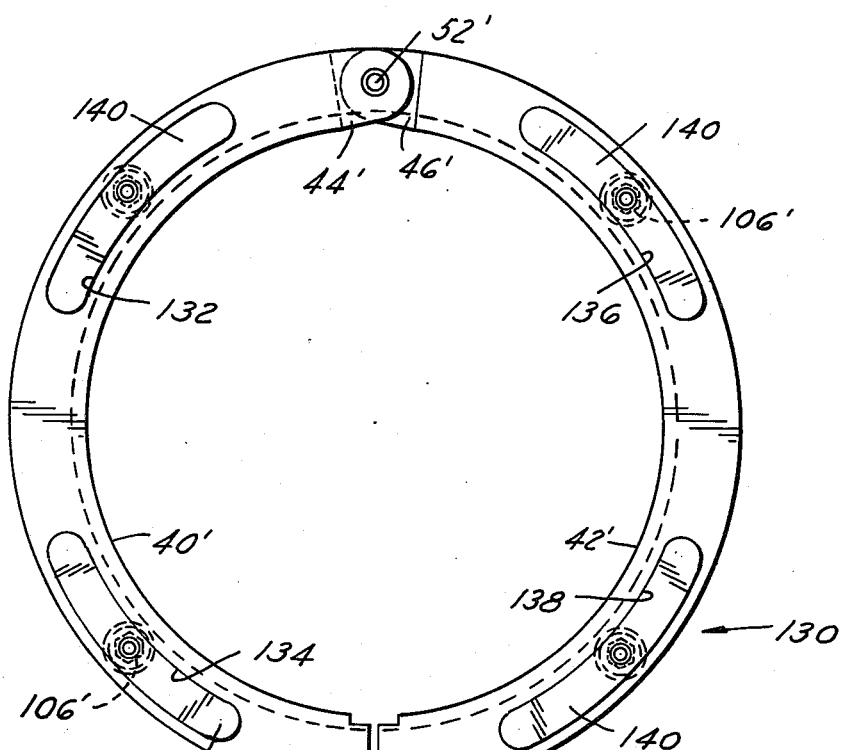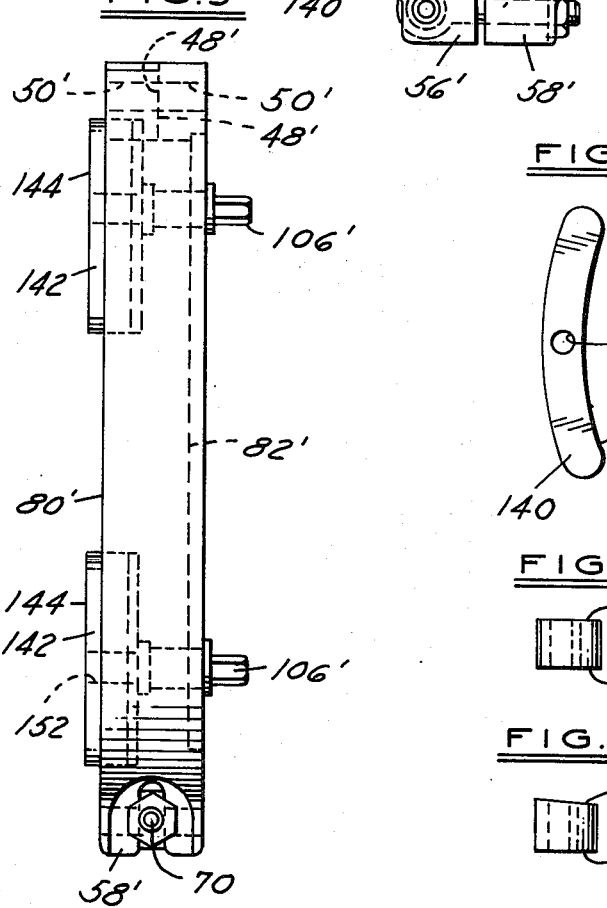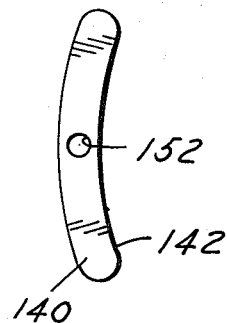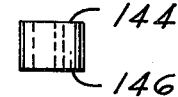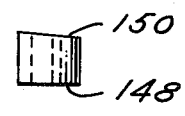

EXPANDABLE ANNULAR CAM-TYPE LOCKING DEVICE FOR A SHAFT

BACKGROUND OF THE INVENTION

1. Field of the Invention

The present invention relates generally to the bearings retainer art and more particularly to an adjustable or expandable bearing retainer or locking device construction which is particularly applicable or use on mill roll necks, shafts and the like.

2. Description of the Prior Art

In one prior art device, the bearings on mill roll necks are maintained in position adjustably spaced from an outer shoulder by a plurality of members which are accurately machined and then accurately positioned on the mill roll neck. Among these members is included an adjustable nut which is threadedly mounted on an externally threaded split thrust ring, the adjustment of the spacing between the bearing and the shoulder being varied by rotating the nut relative to the threaded split ring. Such a construction is not completely satisfactory because the various parts have to be accurately machined. In addition, when the threaded thrust ring is cut in half the metal removed by the cutter leaves spaces between the ends of the ring segments so that when the ring is mounted on the roll neck such spaces have to be compensated for by positioning the ring segments in the same relative positions they occupied prior to the cutting operation. Thus, it is very difficult and often impossible to start the adjusting nut on the externally threaded split ring.

Various solutions have been suggested to the problem of the prior art just described. As an example, the Chievitz, U.S. Pat. No. 2,678,856 of May 18, 1954 entitled "Step-Wise Adjustable Bearing Retainer" suggests the use of one or more annular members which are adapted to be mounted on a shaft between a shoulder provided thereon and an anti-friction bearing mounted on the shaft for limited axial movement relative to the shoulder. The annular members contain opposed side faces having different configurations whereby the spacing between the shoulder and the bearing can be varied in what is referred to as a step-wise fashion by reversing and/or interchanging the annular members. Such annular members are preferably formed in segments and an adjustable annular band-like member is removably disposed about them to maintain the segments in a position on the shaft.

The Gray, U.S. Pat. No. 1,294,792 of Feb. 18, 1919 entitled "Device For Securing Parts to Their Supports" discloses a device for firmly and rigidly clamping the inner casing member of an anti-friction bearing against a shoulder or abutment on the shaft. One purpose of that invention is to avoid the use of screw threads on or in connection with the clamping devices or parts thereof and to bind the casing member fixedly against the abutment with a great force so as to prevent it from loosening or becoming displaced. It includes wedge-shaped members having inclined contacting surfaces which serve to maintain a bearing stationary with respect to the shoulder on the shaft.

Other patents located during a preliminary novelty investigation in the U.S. Patent and Trademark Office are as follows: Hughes, U.S. Pat. No. 270,672 of Jan. 16, 1883; Buchanan, U.S. Pat. No. 1,978,186 of Oct. 23, 1934; Reynolds, U.S. Pat. No. 2,584,740 of Feb. 5, 1952; Waddell, U.S. Pat. No. 3,413,022 of Nov. 26, 1968; Warda, U.S. Pat. No. 3,920,342 of Nov. 18, 1975; and Koch, U.S. Pat. No. 3,953,141 of Apr. 27, 1976.

SUMMARY OF THE PRESENT INVENTION

It is a feature of the present invention to provide a novel expandable annular cam-type locking device for a shaft for adjusting and maintaining the spacing between one or more sleeve-like members, bearings, spacers, seals and/or the like located on the shaft and a shaft abutment.

A further feature of the present invention is to provide a locking device of the aforementioned type which is simple in construction; contains relatively fewer parts than prior art devices; is easy to manufacture; is efficient in operation; and is economical to maintain.

A still further feature of the present invention is to provide a novel locking device of the aforementioned type wherein the locking device comprises a pair of annular members, each having one or more circular recesses therein. A circular cam insert is movably received in each recess. Threaded fasteners are carried by the annular members and are connected to the inserts for expanding or moving same against one or more sleeve-like element mounted on the shaft.

BRIEF DESCRIPTION OF THE DRAWINGS

FIG. 1 is a front elevation of the expandable annular cam-type locking device;

FIG. 2 is a side elevation of the locking device, with the cam inserts shown in solid lines when in an expanded position and shown in dotted lines when in the retracted position;

FIG. 3 is a front elevation of the cam-type insert.

FIG. 4 is an end view of the cam-type insert of FIG. 3;

FIG. 8 is a front elevation of a modified locking device containing a pair of recesses in each of the annular members;

FIG. 9 is a side elevation of the modified locking device of FIG. 8;

FIG. 10 is a front elevation of a modified cam-type insert used with the embodiment of FIGS. 8 and 9.

FIG. 11 is an end view of the cam-type insert of FIG. 10; and

FIG. 12 is an end view of a modified cam-type insert for use with the locking device of FIGS. 8 and 9.

DETAILED DESCRIPTION OF A PREFERRED EMBODIMENT

Figure 5:
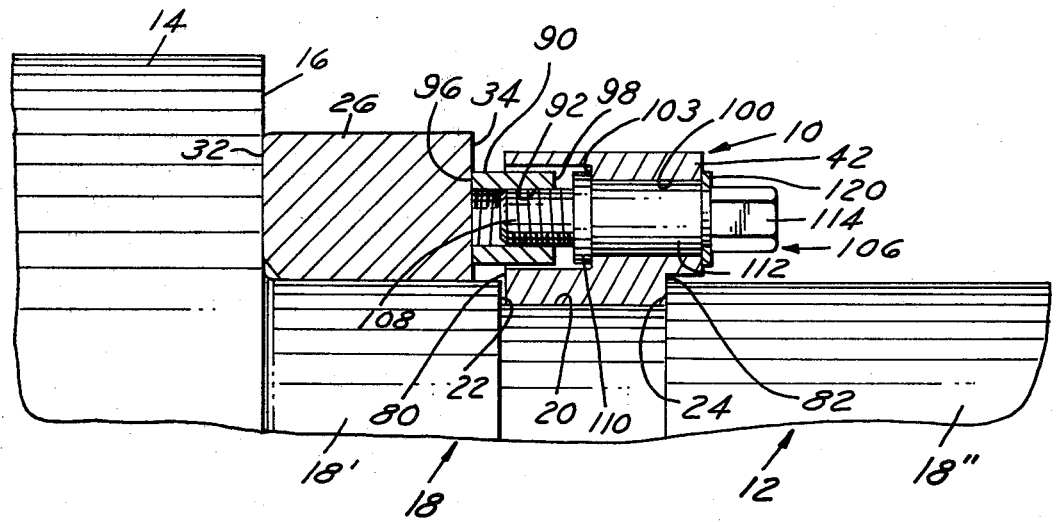
FIG. 5 is a sectional view taken on the line 5—5 of FIG. 1 and shows the locking device in a groove of a mill roll neck or shaft, with the cam inserts therein in an expanded position to urge one or more sleeve-like members against an abutment provided on the shaft.
Figure 6:
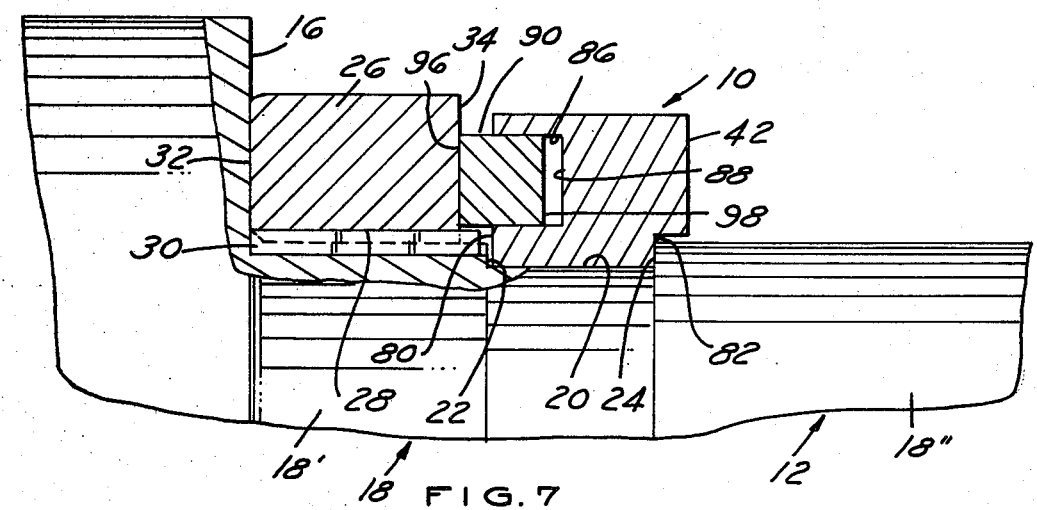
FIG. 6 is a sectional view taken on the line 6—6 of FIG. 1 and shows the locking device in the groove of the mill roll neck or shaft in an expanded position, with the sleeve-like member or members keyed to the shaft or neck.
Figure 7:
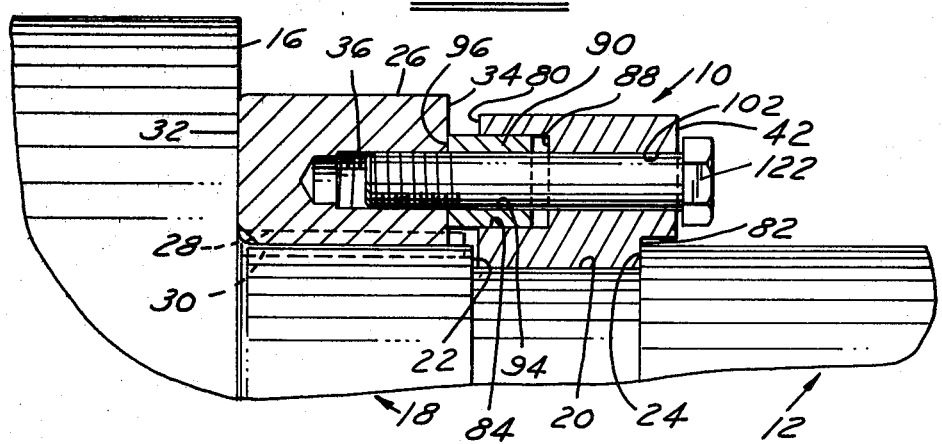
FIG. 7 is a sectional view taken on the line 7—7 of FIG. 1 and shows the locking device in the groove of the mill roll neck or shaft in an expanded position, and a safety bolt carried by the locking device and threaded into the sleeve-like member and which is tightened after the cam-type inserts are expanded.

Referring to the drawings the expandable cam-type locking device is designated by the numeral 10 and is shown in FIGS. 5-7 inclusive mounted on a mill roll neck or shaft 12.

The mill roll neck or shaft 12 is elongated and of generally cylindrical configuration and has a longitudinally extending axis, not shown, which is coincidental to the center axis of the locking device 10.

The mill roll neck or shaft 12 is of varying diameter as shown in FIGS. 5-7 inclusive and has a first cylindrical portion 14 containing or providing a first abutment 16 and a second cylindrical portion 18 having a diameter smaller than the first cylindrical portion 14. An annular groove 20 is provided in the second cylindrical portion 18, the ends of the groove 20 terminating or being defined by oppositely facing second and third abutments 22 and 24. The abutments 16, 22 and 24 are axially aligned, parallel and spaced apart. The cylindrical portion 18 is divided by groove 20 into portions 18' and 18".

The elongated mill roll neck or shaft 12 is provided with conventional anti-friction type bearings, cone type bearings, spacers, seals, etc. For purposes of illustration only a single bearing, spacer or seal is shown and is referred to herein as the sleeve-like member or element 26. It should be appreciated however that any number of sleeve-like members 26 may be mounted on the shaft 12 as is now utilized in the prior art and such sleeve-like members 26 may include various anti-friction bearings, spacers, seals, etc. which are axially spaced on the shaft 12 in abutting relationship and clamped together as a unit against the first abutment 16 by the locking device 10 as will subsequently appear.

The sleeve-like member or members 26 have a keyway 28 for receiving the elongated key 30 fixed in and secured to the cylindrical portion 18' for aligning same on the shaft 12 and preventing rotation of same relative to the shaft 12. The sleeve-like member 26 has a pair of flat and parallel faces 32, 34. Face 32 engages the first abutment 16 when the locking device 10 is in an expanded position as shown in FIGS. 5-7 inclusive. Thus the sleeve-like element 26 is mounted on the second cylindrical portion 18 of the shaft at the side of the groove closest to the first abutment 16. Each sleeve-like member or element 26 is provided with a pair of blind threaded holes 36 which extend through the flat face 34 (FIG. 7) into the member 26. The holes 36 are located 180° apart and have axes parallel to and spaced from the longitudinally extending axis of shaft 12.

Referring now to FIGS. 1-4 inclusive, the expandable cam-type locking device 10 comprises a pair of split annular members, rings, or segments 40, 42, each having an angular extent of more than 180°, and which are disposed in the annular groove 20 about the shaft 12. The split rings 40, 42 are cast from aluminum. Annular members 40, 42 are provided with overlapping end portions 44, 46 respectively of reduced thickness than the remaining portions thereof. End portions 44, 46 have abutting flat surfaces 48 (FIG. 2) and are provided with openings 50 extending therethrough. A pivot pin 52 of cylindrical configuration is received in openings 50 and is secured therein by means not shown. Pin 52 forms a pivot for the members 40 and 42 to permit them to be mounted on shaft 12.

The annular members 40, 42 have a second pair of end portions 56, 58 which are larger in size than the other portions of the members 40, 42 when viewed in FIG. 1. End portions 56, 58 have opposing flat faces or surfaces 60, 62 facing one another. The inner surface or diameter 64 of members 40, 42 directly opposite the end portions 56, 58 is provided with a keyway 66, forming partly in each member 40, 42, which engages a key, not shown, carried by the drive roll or cylindrical portion 18 defining the groove 20 to prevent the locking device 10 from rotating on the shaft 12.

The end portion or lug 56 of annular member 40 is provided with an opening or slot to permit the insertion of an eye bolt 70 having a closed loop 72 on one end and a threaded portion 74 on the other end. The loop 72 of the eye bolt 70 is held in lug 56 by means of a pin 76 which extends through openings provided in the lug 56 on opposite sides of the slot in which the loop 72 is located. A hex jam nut 78 is threaded to the threaded portion 74 of the eye bolt 70. The eye bolt 70 is adjusted to secure the split annular members or rings 40, 42 together after the rings are inserted in the roll groove 20.

The split annular rings or members 40, 42 each have a pair of first and second flat surfaces 80, 82 respectively. The first surface 80 faces the second abutment 22 while the second surface 82 faces the third abutment 24.

The split annular rings or members 40, 42 have identical circular cam recesses 84, 86 respectively provided in the first flat surface 80, each having an angular extent of less than 180° as shown in FIG. 1. The ends of the recesses 84, 86 are spaced from the end portions of the annular members 40, 42. The recesses 84, 86 have a flat bottom surface or intermediate portion 88 between the flat surfaces 80, 82. The circular recesses 84, 86 are located radially outwardly from the shaft portion 18.

Each circular recess 84, 86 receives a camtype insert 90 (FIGS. 3 and 4) of part-circular configuration having an angular extent of less than 180° like the recesses 84, 86. Inserts 90 are received in recesses 84, 86 and are expandable or movable in a direction relative to the recesses 84, 86. The inserts 90 have a relatively close fit with the sides of the recesses 84, 86.

Each cam-type insert 90 has a pair of threaded holes 92 equally spaced from the center of the insert 90 where a non-threaded hole 94 is located. The holes 92, 94 extend completely through the insert 90 from one flat face 96 to the other flat face 98. The faces 96, 98 are flat and parallel to the several abutments 16, 22 and 24. Flat face 96 engages the face 34 on the sleeve-like member 26. When the inserts 90 are expanded, the flat faces 98 are spaced from the intermediate surface or bottom 88 of the recesses 84, 86 as shown in FIGS. 5-7 inclusive.

The split aluminum castings or rings 40, 42 when made are each provided with a pair of non-threaded openings 100 (FIGS. 2 and 5) located on opposite sides of the center thereof where another non-threaded opening 102 (FIGS. 2 and 7) is located. The openings 100 adjacent the intermediate surface 88 are enlarged to form a cavity 101 having a recessed shoulder 103 where the thrust is applied when the inserts 90 are expanded as will subsequently be explained. The three openings just described provided in each ring or member 40, 42 are aligned with the corresponding openings 92, 94 provided in he insert 90. The openings 102 in rings 40, 42 and the matching openings 94 in insert 90 are located 180° apart to match the threaded holes 36 provided in the spacer or sleeve-like element or member 26.

FIG. 2 shows the inserts 90 in an expanded position by the solid lines and in a retracted position by the dotted lines. Means carried by the split annular members 40, 42 are provided for expanding and retracting the inserts 90. Such means includes a pair of threaded fasteners or shoulder bolts 106 for each annular member 40, 42.

Each threaded fastener 106 is of identical construction and includes a threaded end portion 108 provided with left hand threads, an annular shoulder 110, a shank portion 112 and a hex operating end portion 114.

The shoulder bolts 106 are inserted in correspondingly aligned openings 100 and 92, with the threaded end portions 108 being threadedly connected to the threaded openings 92 of inserts 90. Rotation of the shoulder bolts 106 at the operating ends 114 in one direction is effective to expand the inserts 90 against the sleeve-like member 26 and in turn against the first abutment 16. As mentioned previously, the shoulder bolts 106 and threaded openings 92 are provided with left hand threads. During the expansion of the inserts 90 towards the first abutment 16 the annular shoulders or collars 110 exert a thrust or force against the recessed shoulders 103 provided in the intermediate surface 88 which urges the flat surfaces 82 of the annular rings 40, 42 against the third abutment 24 thus locking the device 10 in the groove 20 and maintaining on the shaft 12 the sleeve-like member or members 26 in engaged working relation relative to the first shaft abutment 16. Each shoulder bolt 106 is provided with a retaining ring 120 (FIG. 5).

Once the inserts 90 have been expanded, second means are provided for insuring that the relationship of the locking ring assembly 10 and shaft components are maintained. This is achieved by using a threaded bolt 122 (FIG. 7) with each annular member 40, 42. The bolts 122 extend through the centrally located openings 102 and 94 provided in the annular member 40, 42 and in the inserts 90 respectively and from there into the threaded openings 36 provided in the sleeve-like member 26. The bolts 122 form positive safety devices and are tightened after the cam inserts 90 are expanded.

The locking device 130 shown in FIGS. 9-11 inclusive operates and functions in the same manner as locking device 10. The locking device 130 comprises a pair of split annular members 40', 42', each having an angular extent of more than 180°. The members 40' and 42' are cast from aluminum and are provided with overlapping end portions 44', 46' respectively. End portions 44', 46' have abutting flat surfaces 48' (FIG. 9) and are provided with openings 50' extending therethrough. A pivot pin 52' forms a pivot for the members 40' and 42' to permit them to be mounted on a shaft.

The second pair of end portions 56', 58' on annular members 40', 42' are constructed in the same manner as in locking device 10, with an eye bolt 70' being provided and being adjustable to secure the annular members 40', 42' together.

Annular members 40', 42' each have a pair of first and second flat surfaces 80', 82'. The first surface 80' of member 40' has a pair of identical circular cam recesses 132, 134 while the first surface 80' of member 42' has a corresponding pair of identical circular cam recesses 136, 138. Each recess 132, 134, 136, 138 has an angular extent of less than 90° as shown in FIG. 8. The adjacent ends of each pair of recesses on members 40', 42' are spaced circumferentially apart. Also the other ends of each pair of recesses on members 40', 42' are spaced from the end portions of the annular members 40', 42'. Each recess 132, 134, 136 and 138 has a flat bottom surface 140.

Each recess 132, 134, 136 and 138 receives a cam-type insert 142 of part-circular configuration having an angular extent corresponding to the angular extent of the corresponding recess. The inserts 142 have a relatively close fit with the sides of the recesses 132, 134, 136 and 138.

The insert 142 may have a pair of flat and parallel faces 144, 146 (FIG. 11) or may have a flat face 148 and an inclined face 150 (FIG. 12). Each insert has a single threaded hole 152 extending completely through the insert from one face to the other. Means carried by the split annular members 40', 42' are provided for expanding and retracting the inserts 142. Such means includes a single shoulder bolt 106' for each insert 142.

The locking device 130 operates and functions on a shaft in the same manner as device 10. The locking devices 10 and 130 are similar in most respects except that the annular members of device 130 each has a pair of recesses and a pair of inserts rather than a single recess and a single insert as in locking device 10.

It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. In combination, a shaft of varying diameter, with a first portion of the shaft containing a first abutment and with a second portion of the shaft having a diameter smaller than the first portion and being provided with an annular groove having oppositely facing second and third abutments which are axially aligned with and spaced from said first abutment, at least one sleeve-like element mounted on said second portion of the shaft at the side of said groove closest to said first abutment for engagement therewith, and an annular locking device for retaining said sleeve-like element against said first abutment, said locking device being formed by a pair of members disposed in said annular groove about opposite portions of said shaft, each of said members having a pair of first and second flat surfaces which face said second and third abutments respectively, said members having curved recesses in said first face located radially outwardly from the second portion of said shaft, cam inserts received in said recesses and movable therein axially of said shaft, said inserts each having a pair of faces with one face opposite and engageable with the sleeve-like element, and first means carried by said members and connected to said inserts for expanding and urging said inserts against the sleeve-like element and in turn against said first abutment, with said second flat surfaces bearing against said third abutment.

2. The combination of claim 1 wherein second means are carried by said members and inserts and are connected to said sleeve-like element for positively securing the said locking device and sleeve-like element between said first and third abutments.

3. The combination of claim 1 wherein said first means is in the form of adjustable threaded fasteners, each fastener having a threaded end received in a threaded opening in the corresponding insert.

4. The combination of claim 3 wherein said threaded fasteners and the corresponding threaded openings are provided with left hand threads.

5. The combination of claim 1 wherein each of said recesses terminate in a flat intermediate shoulder parallel to and intermediate said first and second flat surfaces, said first means is in the form of a pair of adjustable threaded fasteners carried by each of said members, each fastener having an operating end, a threaded end and an annular shoulder between the ends, with the threaded end threadedly secured to an insert and with the shoulder bearing against said intermediate shoulder, the rotation of said fasteners through said operating ends being effective to expand and urge said inserts against said sleeve-like element, while the intermediate shoulders on said fasteners urge the second flat surfaces on said members against said third abutment.

6. The combination of claim 5 wherein second means are carried by said members and inserts and are connected to said sleeve-like element for positively securing the said locking device and sleeve-like element between said first and third abutments.

7. The combination of claim 6 wherein said second means includes a pair of threaded bolts, one bolt for each member, each bolt extending through the corresponding member and insert, with the threaded end thereof threadedly received in said sleeve-like element.

8. An expandable annular locking device for a shaft having an axis, with the locking device being adapted to be disposed in an annular groove of the shaft to surround same, said annular locking device comprising a pair of members having first overlapping end portions which are pivotally connected and second end portions adjustably secured together, said members each having a pair of first and second flat surfaces and a curved recess in said first flat surface, a cam insert movably received in each recess and having a pair of faces, and first means carried by said members and connected to each insert for moving same in the direction of the axis.

9. The locking device of claim 8 wherein second means are carried by said members and inserts which are adapted to secure the locking device to a sleeve-like member located on the shaft.

10. The locking device of claim 8 wherein said first means is in the form of adjustable threaded fasteners, each fastener having a threaded end received in a threaded opening in the corresponding insert.

11. The locking device of claim 10 wherein said threaded fasteners and the corresponding threaded openings are provided with left hand threads.

12. The locking device of claim 8 wherein each recess terminates in a flat intermediate shoulder parallel to and intermediate said first and second flat surfaces, said first means is in the form of a pair of adjustable threaded fasteners carried by each of said members, each fastener having an operating end, a threaded end and an annular shoulder between the ends thereof, with the threaded end of the fastener threadedly secured to an insert and with the annular shoulder thereon bearing against said intermediate shoulder, the rotation of the fasteners through said operating ends being adapted to expand and urge the inserts against a sleeve-like element located on the shaft.

13. The locking device of claim 12 wherein second means are carried by said members and inserts which are adapted to secure the locking device to the sleeve-like member located on the shaft.

14. The locking device of claim 13 wherein said second means includes a pair of threaded bolts, one bolt for each member, each bolt extending through the corresponding member and insert, with the threaded end thereof being adapted to be threadedly received by the sleeve-like element mounted on the shaft.

15. The locking device of claim 8 wherein said members each have an angular extent of greater than 180°, and each recess and insert has an angular extent of less than 180°.

16. The locking device of claim 8 wherein said first overlapping end portions have aligned openings and a pivot pin located in said aligned openings to permit the inside diameter of the members to be varied through the adjustment provided by the pivoting of the members about said pin.

17. The locking device of claim 16 wherein said second end portions are adjustably secured together by means of an eye bolt pinned on one end thereof to one member, with the bolt extending through said annular members and having a threaded portion extending beyond said other member, and a nut threaded to the threaded portion of said eye bolt for maintaining the proper inside diameter of the members.

18. The locking device of claim 17 wherein said first and second flat surfaces of said members and said faces of said cam inserts are parallel.

19. The locking device of claim 12 wherein said first and second flat surfaces of said members and said faces of said cam inserts are parallel.

20. The locking device of claim 8 wherein each first surface has a pair of recesses therein which are spaced circumferentially apart.

21. The locking device of claim 20 wherein the pair of faces on each insert are parallel.

22. The locking device of claim 20 wherein one face of each insert is inclined towards the other face.

* * * * *